United States Patent
Tsunehiro (10) Patent No.: US 6,304,761 B1
(45) Date of Patent: *Oct. 16, 2001

(54) MOBILE UNIT COMMUNICATION APPARATUS HAVING DIGITAL AND ANALOG COMMUNICATION MODES AND A METHOD OF CONTROLLING THE SAME

(75) Inventor: Naoshi Tsunehiro, Tokyo (JP)

(73) Assignee: Matsushita Electric Industrial Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/841,106

(22) Filed: Apr. 30, 1997

(30) Foreign Application Priority Data

May 31, 1996 (JP) .................................................. 8-159199

(51) Int. Cl.[7] ................................ H04B 1/38; H04B 7/00
(52) U.S. Cl. ....................... 455/553; 455/38.3; 455/552; 455/574
(58) Field of Search .................................... 455/552, 553, 455/38.3, 574, 127, 343, 572, 422

(56) References Cited

U.S. PATENT DOCUMENTS

| 5,020,094 | * | 5/1991 | Rash et al. | 455/411 |
| 5,175,874 | * | 12/1992 | Auchter | 455/574 |
| 5,422,931 | * | 6/1995 | Austin-Lazarus et al. | 455/553 |
| 5,428,664 | * | 6/1995 | Kobayashi | 379/58 |
| 5,694,420 | * | 12/1997 | Ohki et al. | 455/343 |
| 5,722,046 | * | 2/1998 | Serfay et al. | 455/38.3 |
| 5,745,523 | * | 4/1998 | Dent et al. | 375/216 |
| 5,794,137 | * | 8/1998 | Harte | 455/343 |
| 5,884,189 | * | 3/1999 | Yamazaki et al. | 455/552 |
| 5,898,920 | * | 4/1999 | Jacobs | 455/422 |
| 5,995,559 | * | 11/1999 | Hedberg | 375/340 |

\* cited by examiner

Primary Examiner—Vivian Chang
Assistant Examiner—Charles N. Appiah
(74) Attorney, Agent, or Firm—Parkhurst & Wendel, L.L.P.

(57) ABSTRACT

A mobile unit communication apparatus (COMM APP) having digital and analog transmission (XMSN) modes is disclosed, which comprises: a radio wave XMSN and receiving portion including an antenna for transmitting digital and analog XMSN signals in the digital and analog XMSN modes respectively; a signal (SIG) processing portion including a DSP portion and an ASIC portion for processing the received digital and analog XMSN SIGs in the digital and analog COMM modes respectively; an input and output portion for inputting an input SIG and outputting an output SIG from the digital XMSN SIG from the digital processing portion in the digital COMM mode and from the analog XMSN SIG from the ASIC portion in the analog COMM mode; and a supply power saving portion for operating the ASIC portion and not operating the digital SIG processing portion in the analog COMM mode to reduce a consumption of the supply power. This APP may further comprise: a waiting condition detection portion for detecting a waiting condition and a clock SIG control portion for decreasing a frequency of the clock SIG supplied to the ASIC portion in the analog COMM mode in the waiting condition. This APP intermittently stops supplying the supply power to the ASIC portion for a given interval when it is detected that two successive words in a data stream in forward control channel includes the same data and corresponding method is also disclosed.

6 Claims, 4 Drawing Sheets

MOBILE UNIT COMMUNICATION APPARATUS HAVING DIGITAL AND ANALOG COMMUNICATION MODES AND A METHOD OF CONTROLLING THE SAME

BACKGROUND OF THE INVENTION

1. Field of the Invention

This invention relates to a mobile unit communication apparatus having digital and analog communication modes and a method of controlling the same.

2. Description of the Prior Art

A mobile unit communication apparatus having digital and analog communication modes for communicating with a network through a base station in either of digital or analog communication mode is known.

SUMMARY OF THE INVENTION

The aim of the present invention is to provide an improved mobile unit communication apparatus having digital and analog communication modes and an improved method of controlling the same.

According to the present invention, a mobile unit communication apparatus having digital and analog communication modes is provided, which comprises: a radio wave transmission and receiving portion including an antenna for transmitting digital and analog transmission signals in the digital and analog communication modes respectively; a signal processing portion including a digital signal processing (DSP) portion and an application specific integrated circuit (ASIC) portion for processing the received digital and analog transmission signals in the digital and analog communication modes respectively; an input and output portion for inputting an input signal and outputting an output signal from the digital transmission signal from the digital processing portion in the digital communication mode and from the analog transmission signal from the ASIC portion in the analog communication mode, the digital signal processing portion further processing the input signal which is transmitted by the radio wave transmission and receiving portion in the digital communication mode, the ASIC portion further processing the input signal which is transmitted by the radio wave transmission and receiving portion in the analog communication mode; a power supply portion including a battery for supplying a supply power; and a supply power saving portion for operating the ASIC portion and not operating the digital signal processing portion in the analog communication mode to reduce a consumption of the supply power.

This mobile unit communication apparatus may further comprise: a waiting condition detection portion for detecting a waiting condition of reception and transmission of a call, the ASIC portion being responsive to a clock signal; and a clock signal control portion for decreasing a frequency of the clock signal in the analog communication mode when the waiting condition detects the waiting condition.

In that mobile unit communication apparatus, the analog transmission signal may include a forward control channel repeatedly bearing a data stream including top data and recurrent words, each including predetermined data, the mobile unit communication apparatus further comprising: a data detecting portion for detecting data of two successive recurrent words; a comparing portion for comparing detected data of two successive words following the top data from the data detecting portion; and a supply power controlling portion for stopping supplying the supply power to the ASIC portion for a predetermined interval before the next top data when the detected data of the two successive recurrent words agree with each other.

According to the present invention, a method of controlling a mobile unit communication apparatus having digital and analog communication modes is provided, which comprises the steps of: providing a radio wave transmission and receiving portion including an antenna for transmitting digital and analog transmission signals in the digital and analog communication modes respectively; providing a signal processing portion including a digital signal processing (DSP) portion and an application specific integrated circuit (ASIC) portion for processing the received digital and analog transmission signals in the digital and analog communication modes respectively; providing an input and output portion for inputting an input signal and outputting an output signal from the digital transmission signal from the digital processing portion in the digital communication mode and from the analog transmission signal from the ASIC portion in the analog communication mode, the digital signal processing portion further processing the input signal which is transmitted by the radio wave transmission and receiving portion in the digital communication mode, the ASIC portion further processing the input signal which is transmitted by the radio wave transmission and receiving portion in the analog communication mode; providing a power supply portion including a battery for supplying a supply power, the analog transmission signal including a forward control channel repeatedly bearing data stream, each including top data and recurrent words, each including predetermined data; detecting data of two successive the recurrent words; comparing detected data of two successive words following the top data from the data detecting portion; and stopping supplying the supply power to the ASIC portion for a predetermined interval before the next top data when the detected data of the two successive recurrent words agree with each other.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Figure 1:
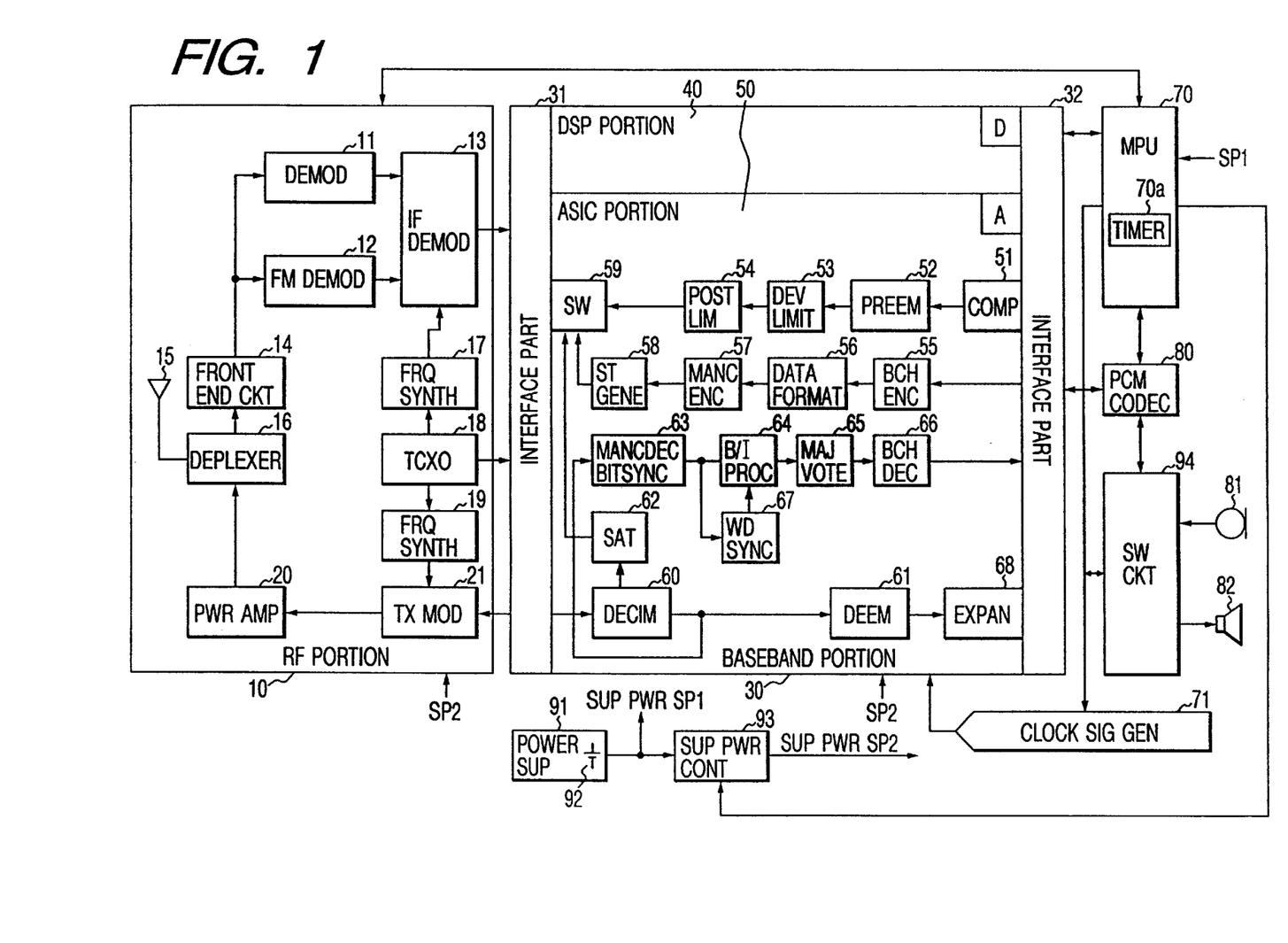
FIG. 1 is a block diagram of a mobile unit communication apparatus having digital and analog communication modes of this invention.

A first embodiment of this invention will be described. FIG. 1 is a block diagram of a mobile unit communication apparatus having digital and analog communication modes of this invention.

The mobile unit communication apparatus of this embodiment comprises a microphone 81 for receiving a sound and generating a sound signal, a speaker 82 for reproducing a sound from a sound signal from a received signal, a PCM codec circuit 80 for a/d converting the sound signal from the microphone 81 and d/a converting the received signal to a sound signal supplied to the speaker 82, a switching circuit 94 for supplying the sound signal from the microphone 81 to the PCM codec circuit 80 and the d/a-converted received signal to the speaker 82 in the digital communication mode and bypassing the PCM codec circuit 80 in the analog communication mode, a baseband portion 30 for processing a digital baseband signal and an analog baseband signal, and a radio frequency (RF) portion 10 for modulating and transmitting a transmission signal and receiving and demodulating a reception signal, a clock generator 71 for supplying a clock signal to the baseband portion 30, and a microprocessor (MPU) 70 for controlling the baseband portion 30, the clock generator 71, the radio frequency portion 10, and the PCM codec 80.

The radio frequency portion 10 comprises an antenna 15 for transmitting the transmission signal and receiving the reception signal, a duplexer 16 for simultaneously transmitting and receiving, an front end circuit 14 for amplifying the reception signal from the antenna 15 via the duplexer 16, a demodulator 11 for demodulating the reception signal digitaly modulated, an FM (frequency modulation) demodulator 12 for FM-demodulating the reception signal, an IF demodulator 13 for intermediate-frequency-demodulating the reception signal from the demodulator 11 or the FM demodulator 12, a reference frequency generator (TCXO) 18 for generating a reference frequency signal, a frequency synthesizer 17 for generating a frequency signal for receiving from the reference frequency signal, a frequency synthesizer 19 for generating a frequency signal for transmission from the reference frequency signal, a modulator (TX MOD) 21 for modulating a transmission signal, and a power amplifier 20 for amplifying the transmission signal from the modulator 21 and supplying it to the antenna 15 via the duplexer 16.

The baseband portion 30 comprises a DSP (digital signal processor) portion 40, an ASIC (application specific integrated circuit) portion 50, an interface portion 31 for effecting interfacing between the RF portion 10 and the base band portion 30, and an interface portion 32 for effecting interfacing between the baseband portion 30 and the microprocessor 70 and the PCM codec circuit 80.

The ASIC portion 50 effects an operation by only hardware, i.e., by a non-programed operation, for providing an analog communication protocol and comprises a transmission sound processing system including a compressing portion (COMP) 51 for compressing an amplitude of an input sound signal from the microphone 81 via the switching circuit 94, a pre-emphasizing portion (PREEM) 52 for emphasizing a high frequency component of the sound signal, a limiter portion (DEV LIMIT) 53 for amplitude-limiting an output of the pre-emphasizing portion 52, a post-limiter (POST LIM) 54 for removing harmonic components of an output of the limiter portion 53 and a transmission data processing system including a BCH encoder (BCH ENC) 55 for encoding the transmission data from the microprocessor 70 to generate a BCH code, a data format portion (DATA FORMAT) 56 for providing a predetermined transmission format to the transmission data, a Manchester encode portion (MANC ENC) 57 for generating a Manchester code, a signal tone generating portion (ST GENE) 58 for generating a signaling tone and adding the signaling tone to the transmission data from the Manchester encode portion 57, and a switch (SW) 59 for supplying either of the transmission data, the transmission sound data, or a supervisory tone mentioned later to the RF portion 10.

The ASIC portion 50 further comprises a reception signal processing system: including a discriminator portion (DECIM) 60 for generating a discriminated baseband signal from an output of the RF portion 10 and a transmission and a reception SAT processing portion 62 for detecting a reception supervisory signal from the discriminated baseband signal and judging it and generating a transmission supervisory signal and supplying the transmission supervisory signal to the switch 59; a reception sound signal processing system for processing a reception sound signal including a de-emphasis processing portion (DEEM) 61 for de-emphasizing an output of the discriminated baseband signal from the discriminator portion 60 to restore the output which high-frequency component emphasized by the pre-emphasis processing to the original signal and an expanding circuit (EXPAN) 68 for expanding the signal amplitude of the reception sound data compressed by the compressor processing; and a control data processing system for processing control data transmitted from a base station including a Manchester decode/bit synchronizing portion (MANCDEC BIT SYNC) 63 for reproducing a synchronizing signal (clock/data) for synchronization with the base station from the discriminated baseband signal from the discriminator portion 60, a ward synchronizing detection processing portion (WD SYNC) 67 for detecting data of a word synchronizing to effect the synchronizing processing, a B/I detection/seizing processing portion (B/I PROC) 64 for detecting Busy/Idle (B/I) bit inserted into a data stream of a forward control channel transmitted to the mobile unit from the base station and effecting a seizing processing, that is, a control of a start and stop of a transmission data from a timing of the detection of the Busy/Idle bit, a majority vote judging portion (MAJ VOTE) 65 for a majority vote processing to data after the Busy/Idle data is extracted, and a BCH correction processing portion 66 for effecting a bit correction processing (restoring a damaged bits).

In this mobile unit communication apparatus, the processing for the digital communication through a digital transmission signal is effected by the DSP portion 40, and the processing for the analog communication through an analog transmission signal is effected by the ASIC portion 50. During the analog communication, an operation of the DSP portion 40 is stopped and only the ASIC portion 50 is operated to perform only the hardware processing.

When the sound data is transmitted in the analog communication mode, the sound inputted from the microphone 81 is directly supplied to the compression circuit 51 and processed by the compression circuit 51, the pre-emphasizing portion 52, the limiter portion 53, and the post-limiter portion 54, and then, supplied to the TX modulation portion 21 of the RF portion 10 via the switch 59 and the interface portion 31, is amplified by the power amplifier 20, and transmitted by the antenna 15.

On the other hand, the reception signal received by the antenna 15 is demodulated by the demodulator 11 for digital communication when the reception signal is digitaly modulated, further demodulated to provide a baseband signal by the IF demodulator 13 by mixing it with a local oscillation signal from the the frequency synthesizer 17, and processed by the DSP portion 40 in the baseband portion 30.

When the reception signal is of the analog communication, the reception signal received by the antenna 15 is demodulated by the FM demodulator 12 for the analog communication, and further demodulated to provide a baseband signal by the IF demodulator 13, and supplied to the discriminator portion 60 of the baseband portion 30 where it is discriminated. The SAT processing portion 62 detects a supervisory signal included in the reception signal, judges it, and generates a transmission supervisory signal from the judging result. This transmission supervisory signal is transmitted to the transmission side by the RF portion 10 via the switch 59.

The sound signal in the reception signal is subjected to the processings of the de-emphasis processing portion 61 and supplied to the speaker 82.

The data transmitted from the base station through the control channel is subjected to processings of the manchester decode/bit synchronizing portion 63, the B/I detection/ seizing processing portion 64, the majority vote judging portion 65, and the BCH correction processing portion 66, and supplied to the microprocessor 70.

Figure 2:
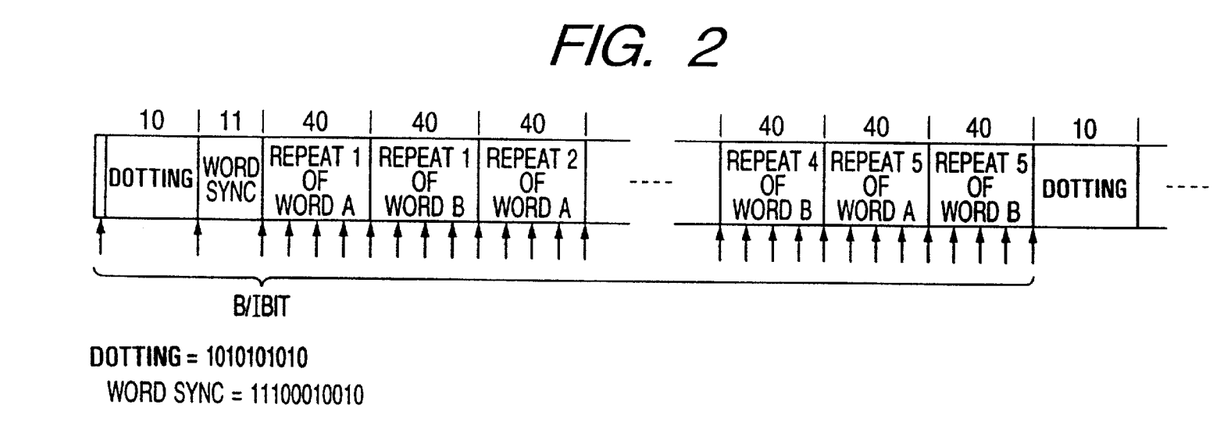
FIG. 2 is an illustration of this invention showing a data format of the control channel of the analog communication.

FIG. 2 is an illustration of this invention showing a data format of the control channel of the analog communication.

In the cases of analog communication protocols such as AMPS (Advanced Mobile Phone Service), NAMPS/TACS (Total Access Communication System), NTACS, and JTACS, the base station transmits a message stream to the mobile unit communication apparatus through a forward control channel, the message stream including five-repeated transmission of ten bits of DOTTING, eleven bits of WORD SYNC, and the following forty bits of WORD A and forty bits of WORD B.

Moreover, one bit of Busy/Idle bit (B/I) as shown in FIG. 2 is inserted with a space, so that a total of the message steam is 463 bits.

A mobile unit communication apparatus extracts one of the data WORD A and the data WORD B from the (message) data stream transmitted through the forward control channel in accordance with the telephone number assigned thereto.

That is, if this mobile unit communication apparatus has an odd telephone number, the B/I detection/seizing processing portion 64 extracts the data of WORD A from the message stream transmitted through the control channel. If this mobile unit communication apparatus has an even telephone number, the B/I detection/seizing processing portion 64 extracts the data WORD B from the message data stream.

The manchester decode/bit synchronizing portion 63 of the baseband portion 30 reproduce a synchronizing signal (clock/data) from the signal subjected to the processing of the baseband processing. The word synchronization detection and processing portion 67 detects the data of WORD SYNC and supplies it to the B/I detection/seizing processing portion 64. The B/I detection/seizing processing portion 64 detects the B/I bit Inserted in the message data stream and control a start and a stop of data reading from the timing of the detection of B/I bit, so that the data WORD A or the data WORD B can be read. The read data is supplied to the microprocessor 70 through the processings of the majority vote judging portion 65 and the BCH correction processing portion 66.

As mentioned, the mobile unit communication apparatus according to the first embodiment effects the waiting operation and the communication operation for transmitting and receiving sound data with only the ASIC portion operated and the DSP portion not operated in the analog communication mode. Therefore, the high speed operation by the DSP portion 40 is unnecessary in the analog communication mode, so that the drive current which is supplied from the battery 92 can be reduced.

Figure 3:
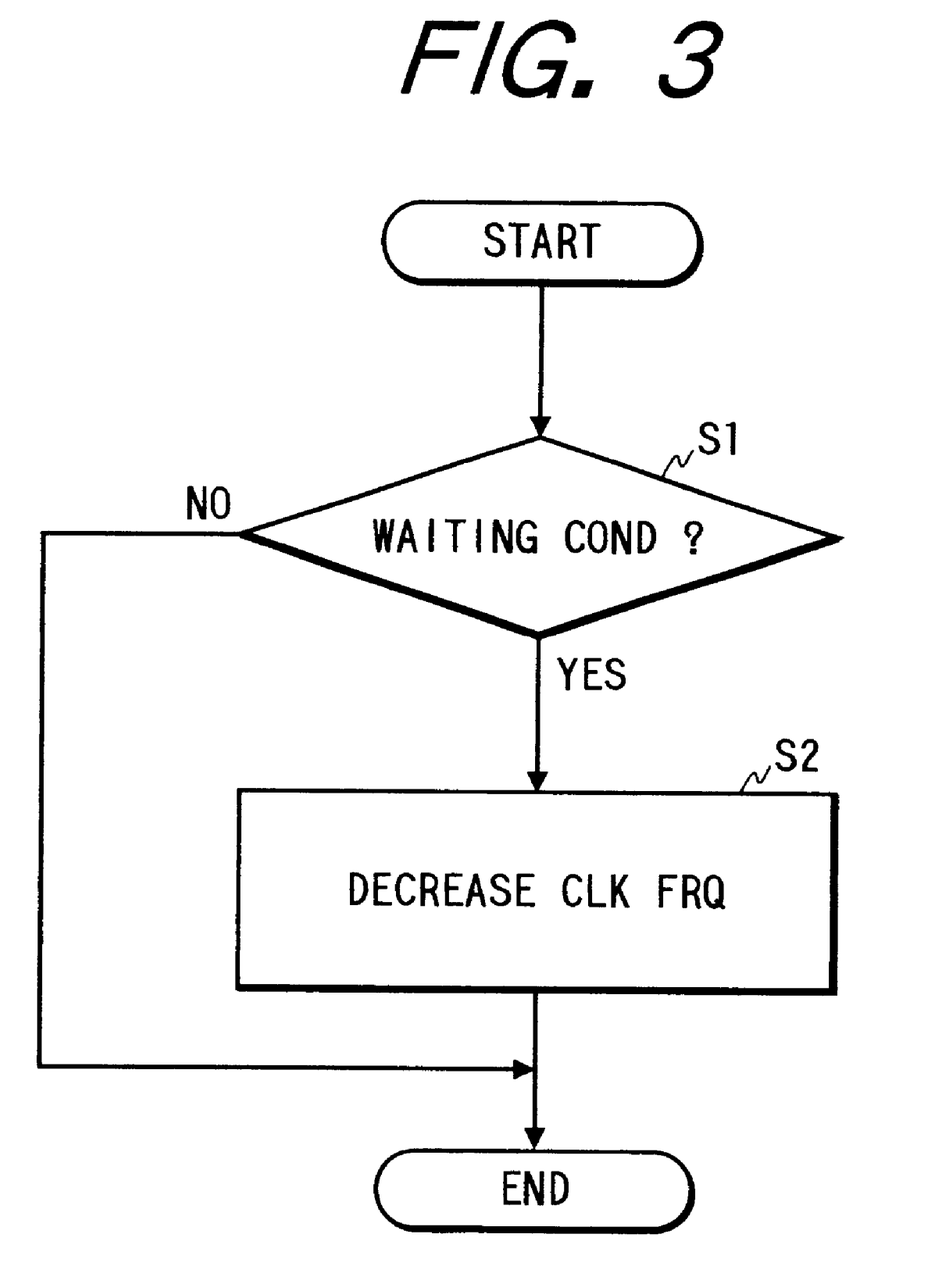
FIG. 3 depicts a flow chart of a first embodiment showing an operation of the microprocessor shown in FIG. 1.

Moreover, in the waiting mode, the microprocessor 70 operates the clock signal generator 71 to reduce the frequency of the clock signal to the ASIC portion 50 to further reduce the power consumption in the mobile unit communication apparatus. FIG. 3 depicts a flow chart of the first embodiment showing an operation of the microprocessor 70.

In step s1, the microprocessor 70 detects a waiting condition, that is, detects whether a call is arriving and whether it is the OFF-HOOK condition. If the waiting condition is detected in the analog communication mode, the microprocessor 70 operates the clock signal generator 71 to decrease the frequency of the clock signal supplied to the ASIC portion 50.

A second embodiment will be described.

A mobile unit communication apparatus has substantially the same structure as that of the first embodiment. The difference is that the microprocessor 70 controls a supply power control circuit 93 to intermittently stop supplying the supply power SP2 to the ASIC portion 50 in a predetermined condition in the waiting mode and further control the clock signal generator 71 to stop supplying the clock signal to the ASIC portion in that condition.

Figure 4:
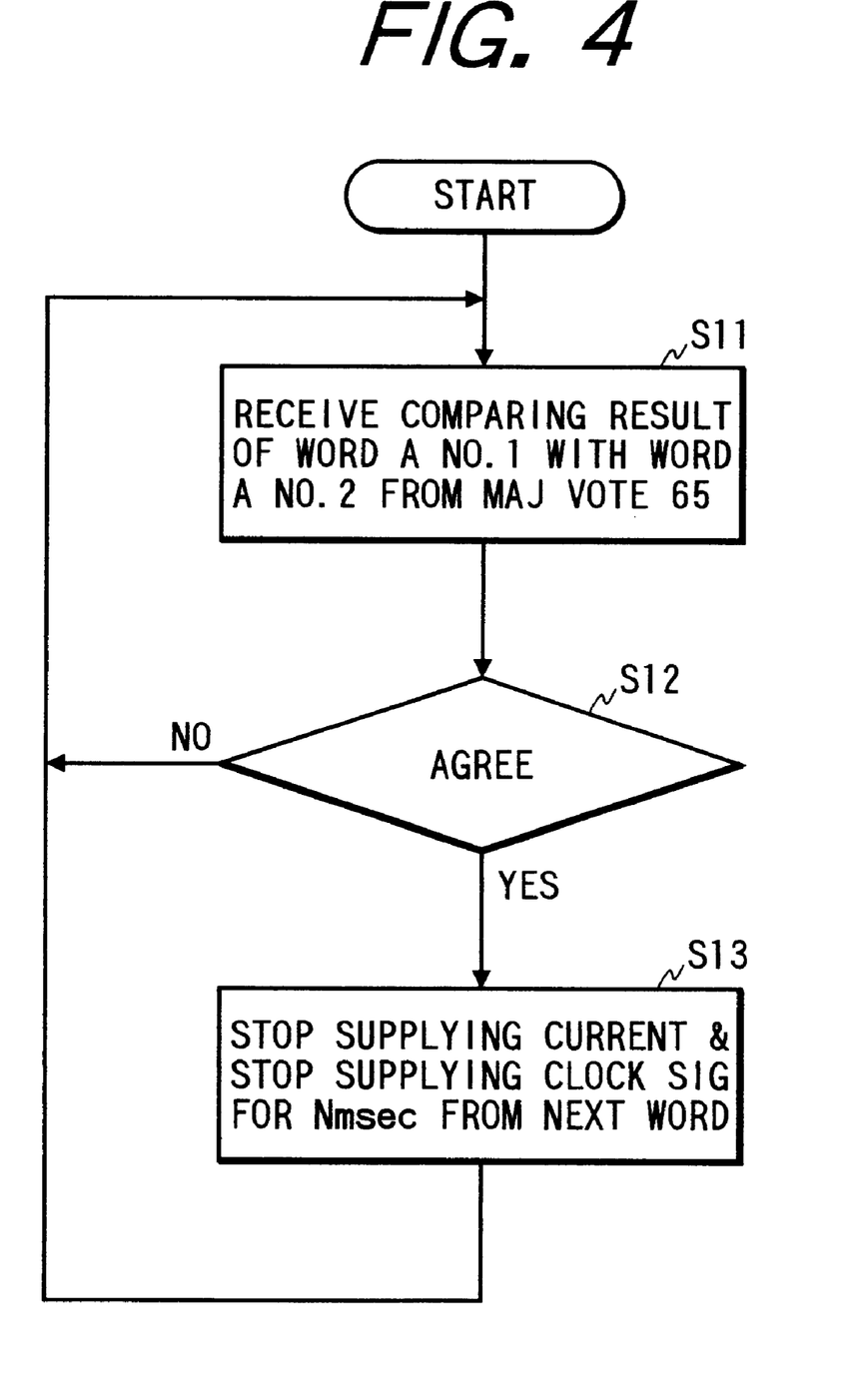
FIG. 4 depicts a flow chart of a second embodiment showing an operation of the microprocessor shown in FIG. 1.

FIG. 4 depicts a flow chart of the second embodiment showing an operation of the microprocessor 70.

If the mobile unit communication apparatus reads data of WORD A from a data stream of the forward control channel, the majority vote judging portion 65 compares the successive data of WORD A No. 1 with the data of WORD A No. 2. In step S11, the microprocessor 70 receives the comparing result of data in Word A No. 1 with data in Word A No. 2 from the majority vote judging portion 65. Because the woard A is repeatedly transmitted in the control channel five times every message data stream in the control channel, if data of respective words A agree with each other, the electric field for reception can be judged to be sufficient.

In the following step s12, if both data agree with each other in step s2, the microprocessor 70 stops supplying current for N msec from the next word, that is, at the top of the Word B No. 2 by controlling the supply power control circuit 93 and stopping supplying the clock signal by the clock signal generator 71. If both data do not agree, processing returns to step s11.

Figure 5:
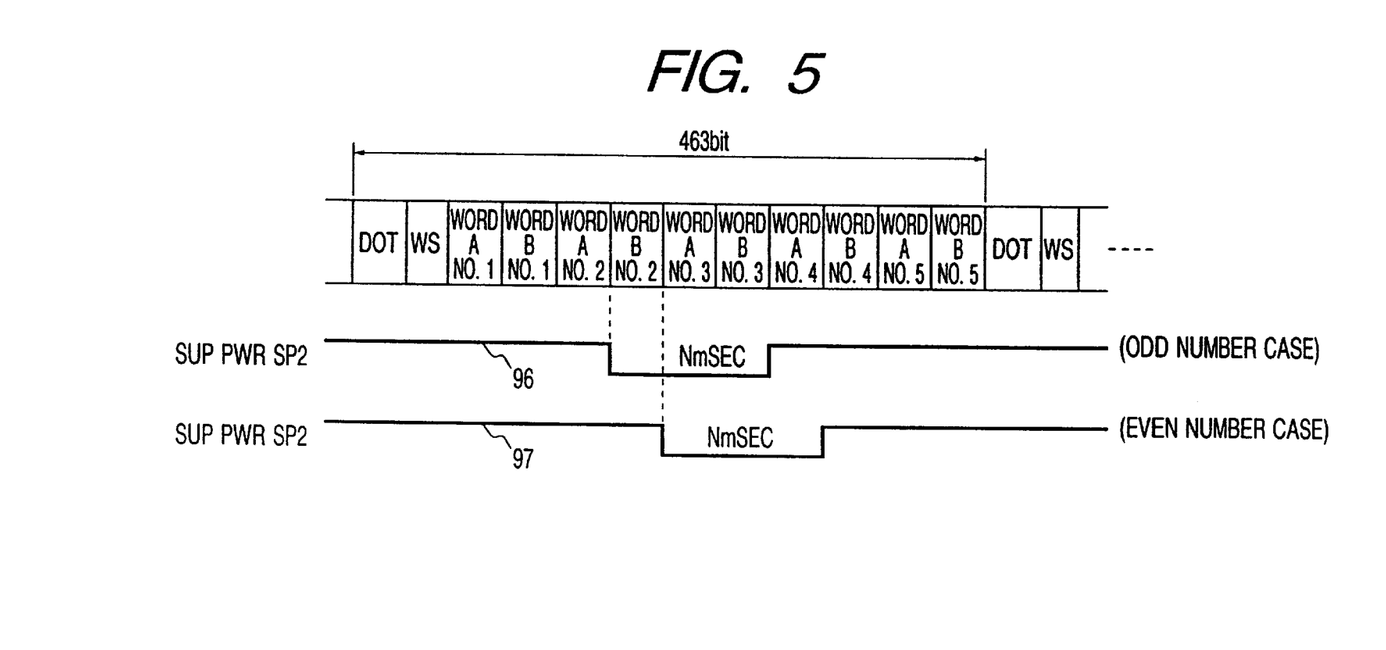
FIG. 5 is an illustration of the second embodiment showing the operation of the intermittent stopping the supply power.

FIG. 5 is an illustration of the second embodiment showing the operation of the intermittent stopping the supply power.

The interval of N msec depends on the system. That is, the supply power is supplied again before the timing of the next DOTTING portion at the top of the next message stream. Thus, the DOTTING portion is repeatedly transmitted, so that the supply power is intermittently supplied to the ASIC portion to save the power consumption.

If the mobile unit communication apparatus reads data of WORD B from the data stream of the forward control channel, the microprocessor 70 receives the comparing result of data in Word B No. 1 with data in Word B No. 2 from the majority vote judging portion 65 in step s11. If both data agree with each other, the microprocessor 70 stops supplying current for N msec from the next word, that is, Word A No. 3 by controlling the supply power control circuit 93 and stopping supplying the clock signal by the clock signal generator 71 as shown by a waveform 97 of the supply power SP2. The majority vote judging portion 65 may directly control the supply power control unit 93 with reference to a timer not shown.

In the analog communication system wherein a transmission interval for one message stream (463 bits) is 46.3 msec, if the data of WORD A is read out, the clock signal is stopped at the timing after 15.5 msec from the top of the message stream and at a timing of (30.8–N) msec, the clock signal is supplied to the ASIC portion 50 again.

In the analog communication system wherein a transmission interval for one message stream (463 bits) is 57.857 msec, if the data of WORD A is read out, the clock signal is stopped at the timing after 19.375 msec from the top of the message stream and at a timing of (38.5–N) msec, the clock signal is supplied to the ASIC portion 50 again.

In the analog communication system wherein a transmission interval for one message stream (463 bits) is 46.3 msec, if the data of WORD B is read out, the clock signal is stopped at the timing after 19.9 msec from the top of the message stream and at a timing of (26.4–N) msec, the clock signal is supplied to the ASIC portion 50 again.

In the analog communication system wherein a transmission interval for one message stream (463 bits) is 57.857 msec, if the data of WORD B is read out, the clock signal is stopped at the timing after 24.875 msec from the top of the message stream and at a timing of (33.0–N) msec, the clock signal is supplied to the ASIC portion 50 again.

Those operations are repeated, so that an intermittently stopping supplying the power to the ASIC portion 50, the DSP portion 40, and the RF portion 10 except to the microprocessor 70 measuring the interval by a timer 70a provided therein on the waiting mode reduces the power consumption.

What is claimed is:

1. A mobile unit communication apparatus having digital and analog communication modes, comprising:
    radio wave transmission and receiving means including an antenna for transmitting and receiving digital and analog transmission signals in said digital and analog communication modes respectively;
    signal processing means including separate processing portions comprising a digital signal processing (DSP) portion for processing said received digital transmission signal in said digital transmission mode and an application specific integrated circuit (ASIC) portion including digital circuits for processing said analog transmission signal from said radio wave transmission and receiving means in said analog communication mode with non-programmed processing in response to a clock signal whose frequency is necessary for said non-programmed processing;
    input and output means for inputting an input signal and outputting an output signal from said digital transmission signal from said digital signal processing portion in said digital communication mode and from said analog transmission signal from said application specific integrated circuit portion in said analog communication mode, said digital signal processing means further processing said input signal which is transmitted by said radio wave transmission and receiving means in said digital communication mode, said application specific integrated circuit portion further processing said input signal which is transmitted by said radio wave transmission and receiving means in said analog communication mode;
    power supply means including a battery for supplying a supply power; and
    supply power saving means for operating said ASIC portion and not operating said digital signal processing portion in said analog communication mode to reduce consumption of said supply power.

2. A mobile unit communication apparatus as claimed in claim 1, further comprising:
    waiting condition detection means for detecting a waiting condition of reception and transmission of a call, said application specific integrated circuit portion being responsive to a clock signal; and
    clock signal control means for decreasing a frequency of said clock signal supplied to said ASIC Portion in said analog communication mode when said waiting condition detects said waiting condition.

3. A mobile unit communication apparatus as claimed in claim 1, wherein said analog transmission signal includes a forward control channel repeatedly bearing data stream, each including top data and recurrent words, each including predetermined data, said mobile unit communication apparatus further comprising:
    data detecting means for detecting data of two successive said recurrent words;
    comparing means for comparing detected data of two successive words following said top data from said data detecting means; and
    supply power controlling means for stopping supplying said supply power to said application specific integrated circuit portion for a predetermined interval before the next top data when said detected data of said two successive recurrent words agree with each other.

4. The mobile unit communication apparatus as claimed in claim 1, wherein said supply power saving means reduces consumption of said supply power by operating said ASIC portion and not operating said digital signal processing portion in said analog communication mode such that high speed operation and power consumption of said digital signal processing portion in said analog communication mode is avoided.

5. A method of controlling a mobile unit communication apparatus having digital and analog communication modes, comprising the steps of:
    providing a radio wave transmission and receiving portion including an antenna for transmitting digital and analog transmission signals in said digital and analog communication modes respectively;
    providing a signal processing portion including a digital signal processing (DSP) portion and an application specific integrated circuit (ASIC) portion for processing said received digital and analog transmission signals in said digital and analog communication modes respectively;
    providing an input and output portion for inputting an input signal and outputting an output signal from said digital transmission signal from said digital processing portion in said digital communication mode and from said analog transmission signal from said application specific integrated circuit portion in said analog communication mode, said digital signal processing portion further processing said input signal which is transmitted by said radio wave transmission and receiving portion in said digital communication mode, said application specific integrated circuit portion further processing said input signal which is transmitted by said radio wave transmission and receiving portion in said analog communication mode;
    providing a power supply portion including a battery for supplying a supply power, said analog transmission signal including a forward control channel repeatedly bearing data stream, each including top data and recurrent words, each including predetermined data;

detecting data of two successive said recurrent words;

comparing detected data of two successive words following said top data from said data detecting portion; and stopping supplying said supply power to said application specific integrated circuit portion for a predetermined interval before the next top data when said detected data of said two successive recurrent words agree with each other.

6. The mobile unit communication apparatus as claimed in claim 1, wherein said supply power saving means reduces consumption of said supply power by operating said ASIC portion and not operating said digital signal processing portion in said analog communication mode such that said digital signal processing portion is not operated in said analog communication mode which would require a higher drive current than the drive current for the ASIC portion operated in the analog communication mode.

* * * * *

UNITED STATES PATENT AND TRADEMARK OFFICE
CERTIFICATE OF CORRECTION

PATENT NO. : 6,304,761 B1
DATED : October 16, 2001
INVENTOR(S) : Naoshi Tsunehiro It is certified that error appears in the above-identified patent and that said Letters Patent is hereby corrected as shown below:

<u>Title page,</u>
Item [75], Inventor, change "Tokyo" to -- Kakegawa-shi, Shizuoka-ken --.

Signed and Sealed this

Third Day of August, 2004

JON W. DUDAS
*Acting Director of the United States Patent and Trademark Office*